United States Patent [19]

Potokar

[11] Patent Number: 5,374,084
[45] Date of Patent: Dec. 20, 1994

[54] COUPLING FOR AUTOMOBILE AIR CONDITIONING SYSTEM

[75] Inventor: Edward Potokar, Richmond Heights, Ohio

[73] Assignee: Parker Hannifin Corporation, Cleveland, Ohio

[21] Appl. No.: 951,073

[22] Filed: Sep. 25, 1992

[51] Int. Cl.⁵ .............................................. F16L 35/00
[52] U.S. Cl. ...................................... 285/27; 285/319; 285/332
[58] Field of Search .................... 285/319, 332, 24, 27, 285/921

[56] References Cited

U.S. PATENT DOCUMENTS

| | | | |
|---|---|---|---|
| 366,541 | 7/1887 | Watson | 285/27 |
| 753,096 | 2/1904 | Osteen | 285/319 X |
| 798,795 | 9/1905 | Itrich et al. | 285/332 X |
| 909,131 | 1/1909 | Antic | 285/332 X |
| 991,374 | 5/1911 | Rolle | 285/319 |
| 1,220,868 | 3/1917 | McSwain | 285/332 X |
| 3,588,149 | 6/1971 | Demler, Sr. | 285/319 X |
| 3,603,621 | 9/1971 | Parsons | 285/319 |
| 3,885,851 | 5/1975 | Bennett | 285/319 X |
| 4,055,359 | 10/1977 | McWhethy . | |
| 4,750,765 | 6/1988 | Cassidy et al. . | |
| 5,058,930 | 10/1991 | Schlosser | 285/319 |
| 5,219,188 | 6/1993 | Abe et al. | 285/319 X |

FOREIGN PATENT DOCUMENTS 9899 of 1906 United Kingdom ................ 285/319

Primary Examiner—Randolph A. Reese
Assistant Examiner—Heather Shackelford
Attorney, Agent, or Firm—Ralph E. Jocke

[57] ABSTRACT

A coupling (10) for connecting hoses or other conduits carrying refrigerant material in an automobile air conditioning system has a male end (12) and a female end (14). The male end has an extending portion (26) which is accepted into an aperture (50) in the female end when the coupling ends are connected. A pair of o-ring seals (34), seal the ends in fluid tight engagement when they are connected. Finger portions (24) on legs (22) of a leaf spring (20) mounted on the male end, engage step areas (68) on the female end to hold the coupling ends together when engaged. The legs nest in slots (64) to prevent relative rotation of the coupling ends. Tapered portions (66) of the slots provide for ease of engagement of the coupling ends. The legs of the leaf spring are biased apart as the coupling ends are pushed together until the finger portions engage the step areas. Disengagement is achieved by spreading the legs of the leaf spring with a special tool (72) and separating the coupling ends.

16 Claims, 6 Drawing Sheets

COUPLING FOR AUTOMOBILE AIR CONDITIONING SYSTEM

TECHNICAL FIELD

This invention relates to fluid couplings. Specifically, this invention relates to couplings for connecting conduits that carry refrigerant material in an automobile air conditioning system.

BACKGROUND ART

It is common to conduct refrigerant in automobile and other air conditioning systems in flexible hoses or metallic tubes. Often the flexible hoses are fitted with ends that include metallic tube portions. The tube portions are adapted to be connected to various components that are parts of the air conditioning system. Such components may include a condenser, compressor, expansion valve, accumulator or receiver/dryer. The tube ends typically include a type of coupling or fitting that involves turning a threaded fastener to insure a solid connection and to seal the tube in fluid tight relation with the conduit or device to which it is connected.

There are several drawbacks associated with conventional connectors for refrigeration hoses and tubes. First, the requirement of turning a fastener or nut can make connections difficult. This is particularly true in a crowded engine compartment. The process of turning the fastener to tighten or untighten the connector is also time consuming. There is also a risk of damage due to over tightening or leakage due to under tightening.

A further drawback associated with conventional fittings is that they may be brought together in various rotational orientations.

This can result in a connected hose being twisted, which stresses the hose and shortens its life. Also, a hose will often rotate with the fastener as it is tightened. This can cause undesirable torsional stresses in the hose as well as improper positioning of the hose in the engine compartment of the car.

Thus, there exists a need for a coupling for conduits used in automotive air conditioning systems that overcomes the problems associated with conventional couplings.

DISCLOSURE OF THE INVENTION

It is an object of the present invention to provide a coupling for air conditioning system conduits that avoids leakage.

It is a further object of the present invention to provide a coupling for air conditioning system conduits that may be readily and quickly connected and disconnected.

It is a further object of the present invention to provide a coupling for air conditioning system conduits that avoids torsional stresses.

It is a further object of the present invention to provide a coupling for air conditioning system conduits that provides a firm connection and is resistent to vibration.

Further objects of the present invention will be made apparent in the following Best Mode for Carrying Out Invention and the appended claims.

The foregoing objects are accomplished in the preferred embodiment of the invention by a coupling for releasably connecting a pair of fluid conduits which carry refrigerant material therethrough. The coupling has a male end and a female end.

The female end has an aperture therein. The aperture is bounded by a cylindrical interior wall. The male end has an extending portion. The extending portion is bounded by a cylindrical exterior wall sized for acceptance into the aperture. The male end includes a fluid passage for enabling the refrigerant fluid to flow through the extending portion and into the female end of the coupling.

The extending portion of the male end includes a pair of spaced grooves. O-ring seals are positioned in the grooves and extend between the interior and exterior walls to prevent leakage of refrigerant material out of the coupling when the ends are connected.

The male end includes a leaf spring mounted thereon. The leaf spring is generally u-shaped in cross section and includes a pair of legs with radially inward extending finger portions at the free ends of the legs.

The female end has a circumferentially extending collar portion. The collar portion has a pair of opposed slots therein. The slots are sized to receive the legs of the leaf spring. The slots are bounded inwardly by tapered portions at the bottom of the slots. The tapered portions increase in height with increasing distance from the male end. The slots terminate in radially inward extending step areas which are adapted to engage the finger portions of the leaf spring.

Connection of the coupling ends is achieved by pushing the ends together with the legs of the leaf spring in alignment with the slots on the female end. The tapered portions of the slots bias the legs of the leaf spring outward until the legs engage the step areas. Once engaged, the interfitting relation of the slots and the legs of the leaf spring prevent relative rotational movement of the coupling ends.

The coupling ends may be quickly disconnected by spreading the legs of the leaf spring to disengage the finger portions from the step areas. This is done with a special tool which makes the task easy. Once this is accomplished, the action of the leaf spring on the tapered portions of the slots aids in separating the ends.

The coupling of the present invention not only provides for quick connection and disconnection, but a fluid tight seal as well. In addition, because the coupling ends need only to be pushed together to fixably connect them, it is easy to connect the coupling in a crowded engine compartment. The fixed rotational position of the connector ends aids in assuring proper articulation and avoids twisting of hoses which helps avoid premature failures. In addition with the coupling of the present invention, there is never a problem of over or under tightening.

BEST MODE FOR CARRYING OUT INVENTION

Figure 1:
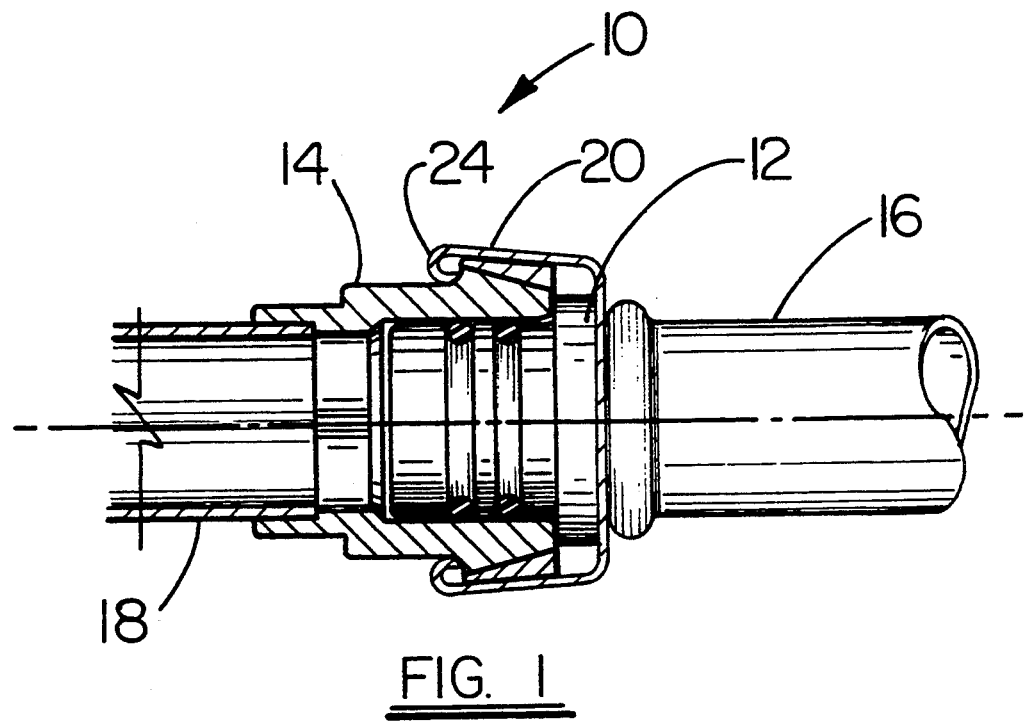
FIG. 1 is a partially sectioned view of the coupling of the present invention in the connected condition, the section of the female coupling end taken along line A—A in FIG. 3.

Referring now to the drawings and particularly to FIG. 1 there is shown therein the coupling of the preferred embodiment of the present invention, generally indicated 10. In FIG. 1 the coupling is shown in connected condition. The coupling has a male end 12 and a female end 14. The male and female ends are shown attached to first and second tubes 16 and 18, respectively. The tubes are adapted for carrying refrigerant material in an automobile air conditioning system. The ends of the tubes that are not shown may be attached to hoses or to components of the air conditioning system such as a receiver/drier, accumulator, compressor, evaporator or condenser.

Figure 2:
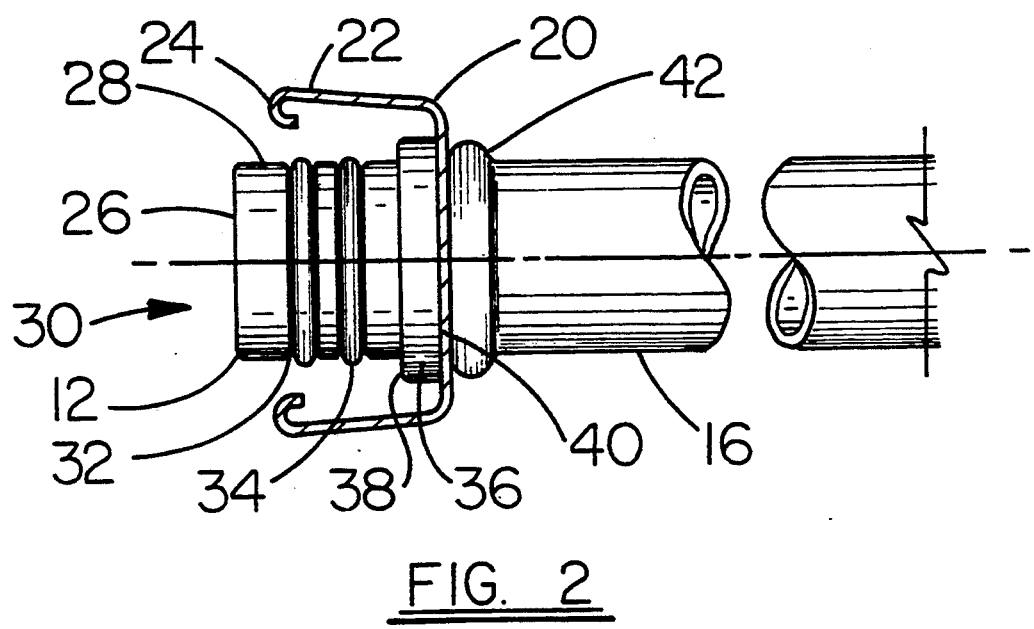
FIG. 2 is a side view of the male coupling end.
Figure 3:
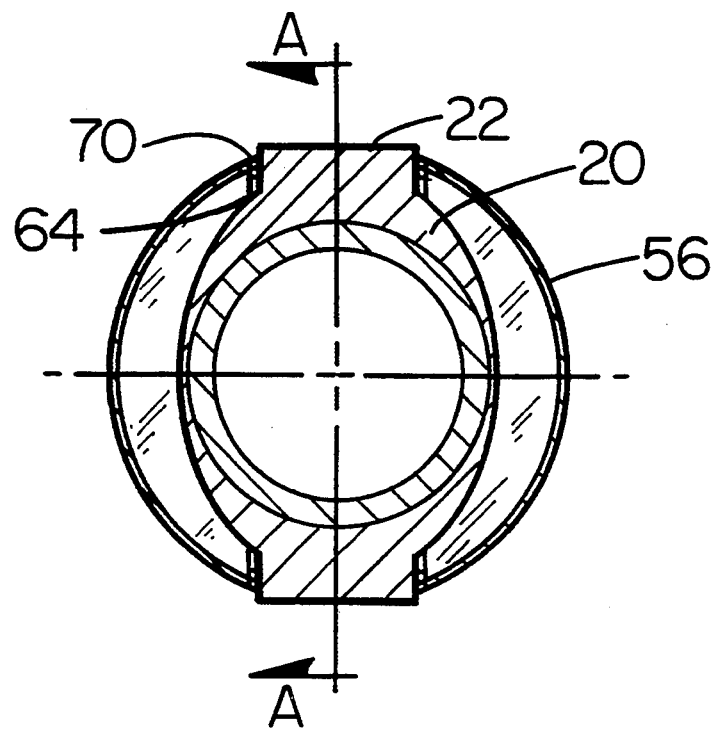
FIG. 3 is a rear view of the coupling ends in connected condition viewed from the rear of the male coupling end.

As shown in FIG. 2, the male end has a leaf spring 20 mounted thereon. Leaf spring 20 has a pair of opposed legs 22 (see FIGS. 7 and 8). Legs 22 have inward extending finger portions 24 that include u-shaped ends.

Male end 12 has a cylindrical extending portion 26 that is bounded by an exterior wall 28. A fluid passage 30 extends through extending portion 26 and is in fluid communication with tube 16. Male end 12 also has a pair of spaced grooves 32 in exterior wall 28. Resilient o-ring seals are positioned in the grooves 32.

Male end 12 has a radially extending flange portion 36. Flange portion 36 has a front wall 38 and a back wall 40. A bump 42 on tube 16, is positioned so that leaf spring 20 is held in crimped relation between back wall 40 of flange portion 36 and bump 42.

Figure 7:
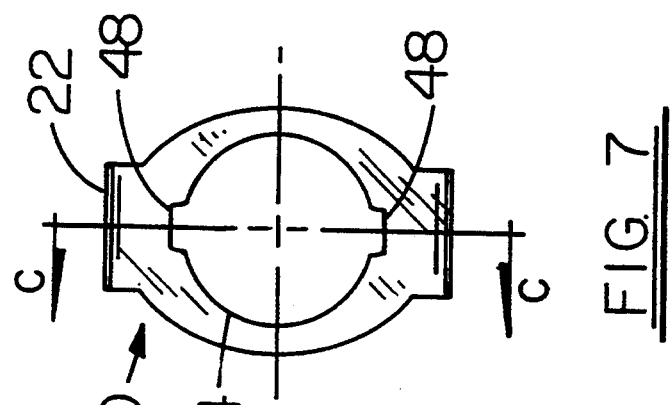
FIG. 7 is a back view of the leaf spring of the coupling.
Figure 8:
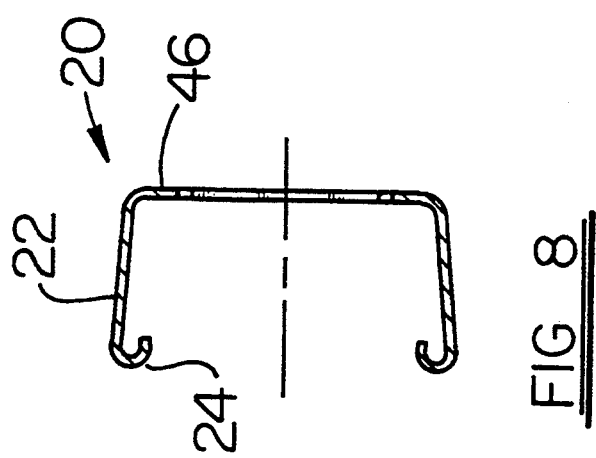
FIG. 8 is a cross sectional view of the leaf spring taken along line C—C in FIG. 7.
Figure 9:
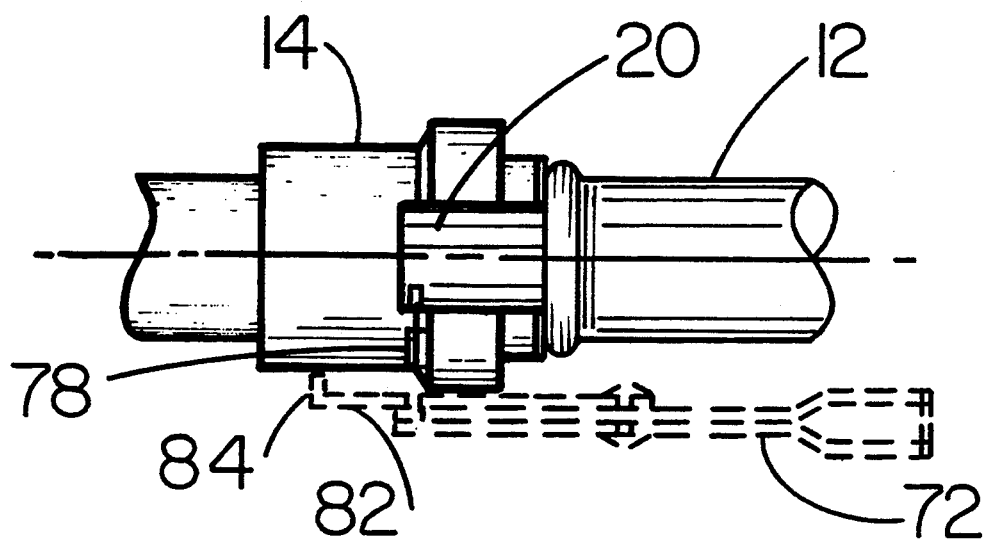
FIG. 9 is a side view of the male and female ends of the coupling in connected condition with the disconnection tool shown in phantom in engaging position.
Figure 10:
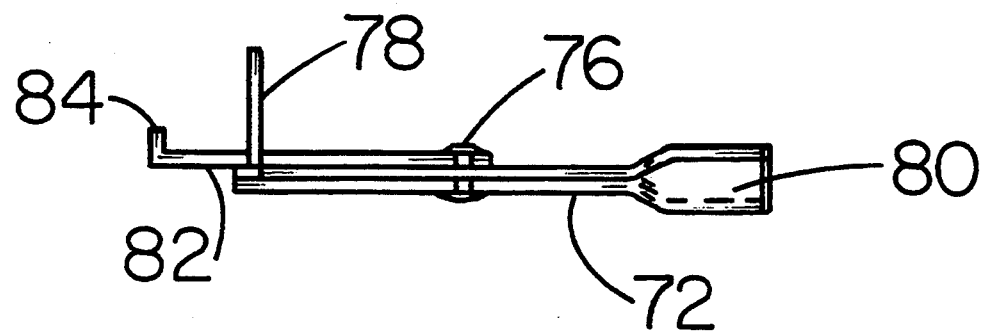
FIG. 10 is a side view of the disconnection tool.
Figure 11:
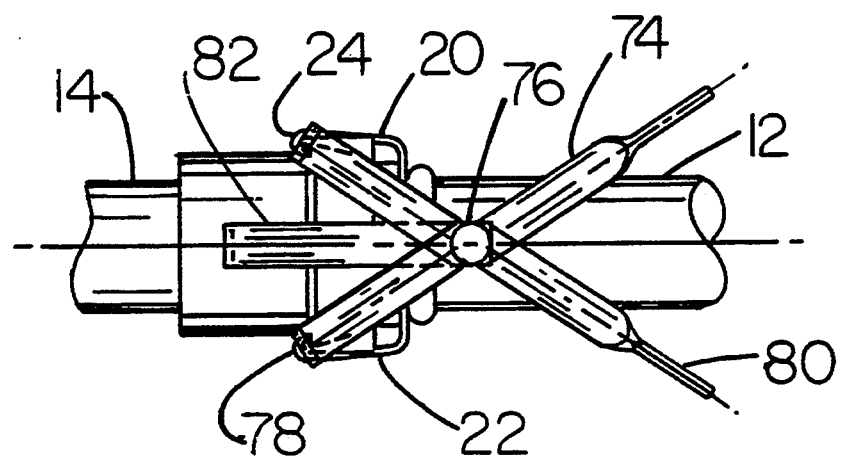
FIG. 11 is a top view of the coupling and disconnection tool, showing the tool disconnecting the coupling ends.

As shown in FIGS. 7 and 8, leaf spring 20 has a generally u-shaped body with a circular opening 44 through a back side 46. Circular opening 44 includes a pair of cut-outs 48.

Figure 4:
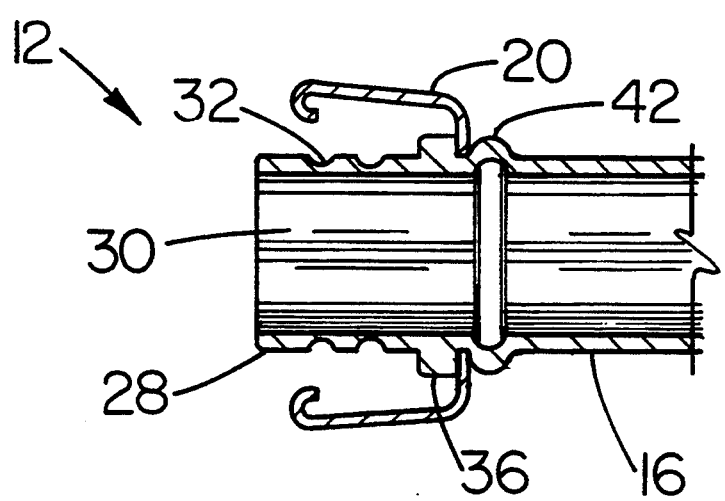
FIG. 4 is a sectional view of the male coupling end taken along line A—A in FIG. 3.

As best shown in FIG. 4, male end 12 in the preferred embodiment, is formed integral with tube 16. During the forming process, extending portion 26 and flange portion 36 are formed first. Leaf spring 20 is then installed over the tube, which at that point in the manufacturing process, does not include bump 42. With the back side 46 of the leaf spring abutting back wall 40 of flange portion 36, bump 42 is formed. During the forming process some metal from the tube is crimped into cut-outs 48 which holds the leaf spring in fixed position. As a result, leaf spring 20 cannot rotate on the male end after the male end is formed.

Figure 5:
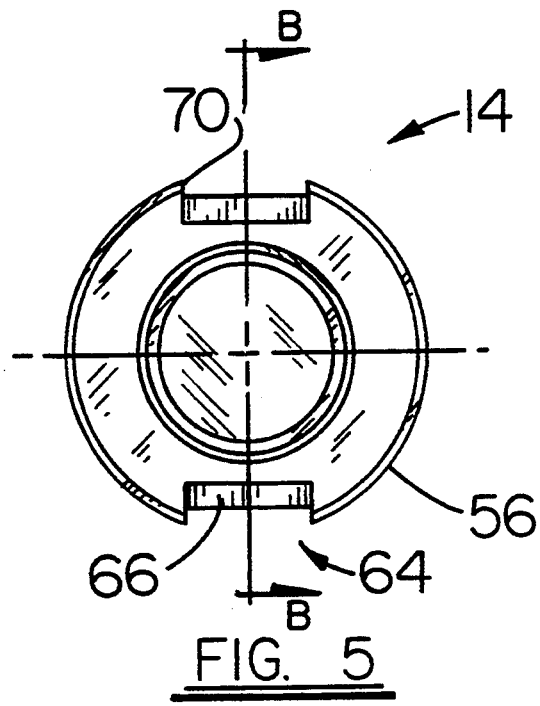
FIG. 5 is a back view of the female coupling end.
Figure 6:
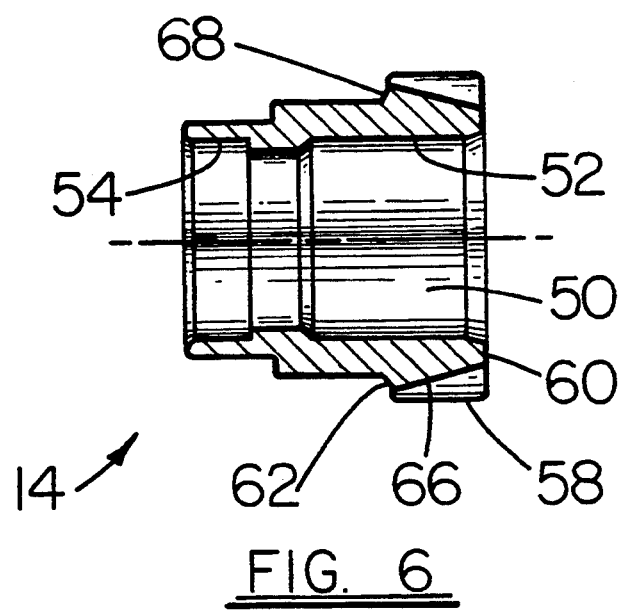
FIG. 6 is a cross sectional view of female coupling end taken along line B—B in FIG. 5.

Female end 14 is shown in greater detail in FIGS. 5 and 6. Female end 14 includes an aperture 50 which is bounded by a cylindrical interior wall 52. Aperture 50 is in fluid communication with the interior of tube 18. In the preferred embodiment, tube 18 is attached to female end 14 by brazing the tube into a recess 54 in the female end.

Female end 14 includes a circumferentially extending collar portion 56. Collar portion 56 is bounded by an outer surface 58. Collar portion 56 is further bounded by a front wall surface 60 and a back wall surface 62.

As best shown in FIG. 5, collar portion 56 includes a pair of opposed slots 64. Slots 64 are bounded radially inward by tapered portions 66. The tapered portions 66 terminate at step areas 68 on back wall surface 62. Slots 64 are bounded by edges 70 that extend above tapered portions 66 along the entire length of the slots.

When the coupling ends are to be connected, the male end 12 and female end 14 are brought together with the extending portion 26 positioned to enter aperture 50. As the ends are pushed together, tapered portions 66 engage in-turned finger portions 24 of the leaf spring 20. As the ends are pushed further together, the legs are biased outward by the tapered portions until finger portions 24 snap inward on step areas 68. The coupling ends are sized such that when the legs of the leaf spring snap into the locked position, the front wall surface 60 of the female end is adjacent to the front wall 38 of flange portion 36.

O-rings 34 serve as seal means when the coupling ends are connected. The o-rings span the area between the exterior wall 28 of the male end and the interior wall 52 of the aperture 50 of the female end. This prevents leaking of the refrigerant material from the coupling. This double o-ring design provides a superior seal and serves to prevent leakage despite vibration and high temperature conditions typically encountered in an automobile engine compartment. In the preferred from of the invention, the o-rings are comprised of neoprene.

The u-shaped finger portions 24 add strength to the connection between the coupling ends by engaging step areas 68 with a back turned surface. As a result, pressure forces which would tend to separate the coupling ends, are applied as tensile forces in the legs of the leaf spring. These tensile forces are readily borne by the carbon steel which is used to form the leaf spring.

When it is desired to disconnect the coupling ends, this may be readily done by opening the legs of the leaf spring.

A special tool 72 for separating the coupling ends is shown in FIGS. 9–12. The tool 72 includes a pair of v-shaped members 74 that are connected at a pivot pin 76. Each v-shaped member includes a pin 78 at a first end. Each v-shaped member includes a flattened grip 80 at the end opposite the pins. The tool 72 also includes an arm 82 extending from pivot pin 76. Arm 82 has an in-turned lip 84.

Tool 72 is used to release the coupling ends by placing pins 78 of members 74 into the rounded finger portions 24 of leaf spring 20. The grips 80 of tool 72 are then moved together to spread the legs 22 of leaf spring 20. This enables the finger portions to disengage the step areas. Further, once the finger portions of the leaf spring come into engagement with the tapered portions of the female coupling end, the biasing force of the leaf spring helps to separate the coupling ends.

Figure 12:
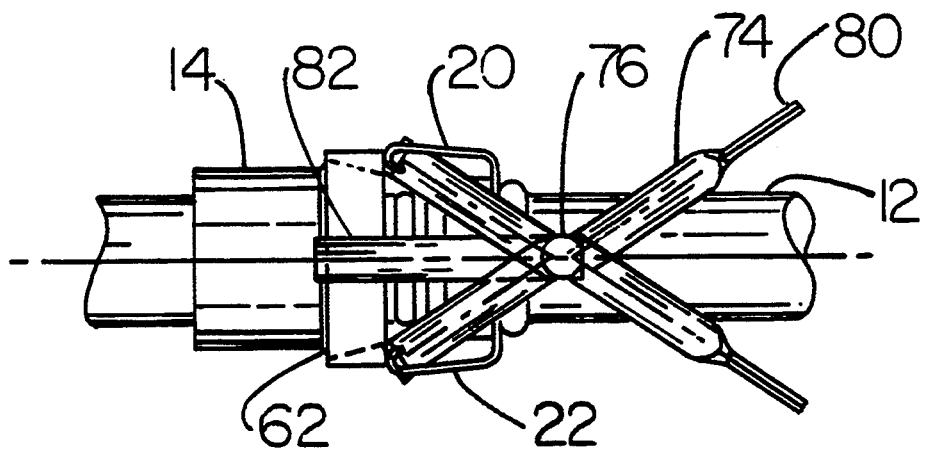
FIG. 12 is a top view of the disconnection tool with the coupling ends separated.

Arm 82 also serves to help prevent unexpected separation and whipping of the coupling ends in the event they are pressurized as shown in FIG. 12, lip 84 of arm 82 tends to catch the back wall surface 62 of the female coupling end to prevent the ends from moving more than slightly apart. This facilitates controlled release of any fluid pressure.

A further advantage of the coupling of the present invention is that it resists lateral movement. This is because when the coupling ends are connected, the legs 22 of the leaf spring nest in slots 64. As a result, the slot edges 70 prevent the ends from rotating relative to one another. An advantage associated with avoiding rotation is that the hoses which are attached to the coupling (or the tubes which extend from the coupling) may be mounted so that they are in the desired position for installation in the vehicle. Because no twisting or turning of a fastener is required to connect the coupling ends of the present invention, it is generally assured that the hose which is connected through the coupling is free of torsional stress which could shorten the life of the hose.

The coupling of the present invention is also easy to connect and no tools are required. This is particularly important in a crowded engine compartment. The coupling of the present invention is also well suited to mass production techniques as it requires little time to connect the coupling ends.

Thus, the new coupling for automobile air conditioning system conduits of the present invention achieves the above stated objectives, eliminates difficulties encountered in the use of prior devices and systems, solves problems and attains the desirable results described herein.

In the foregoing description, certain terms have been used for brevity, clarity and understanding, however no unnecessary limitations are to be implied therefrom because such terms are for descriptive purposes and are intended to be broadly construed. Moreover, the descriptions and illustrations given are by way of examples and invention is not limited to the exact details shown or described.

Having described the features, discoveries and principles of the invention, the manner in which it is utilized, and the advantages and useful results obtained; the new and useful structures, devices, elements, arrangements, parts, combinations, systems, equipment, operations, methods and relationships are set forth in the appended claims.

I claim:

1. A coupling for releasably connecting a pair of fluid conduits in fluid tight relation and for enabling the flow of fluid material therethrough, comprising:

a male end and a female end;

said female end including an aperture therein, said aperture bounded by an interior wall, said male end including an extending portion, said extending portion bounded by an exterior wall, said extending portion accepted in said aperture when said coupling ends are engaged;

said male end further including a first fluid passage through said extending portion whereby fluid material is enabled to flow between said male end and said female end;

seal means extending between said interior wall of said aperture and said exterior wall of said extending portion when said coupling ends are engaged, for preventing leakage of fluid material thereinbetween;

a first leaf spring leg member extending between and engaging said male and female ends when said coupling ends are engaged, said leaf spring leg member having a first end fixably attached to one of said coupling ends and a second end opposed of said first end, said second end of said leaf spring leg member including a radially inward extending in-turned finger portion; a collar portion extending circumferentially about said coupling end not fixably attached to said leaf spring leg member, said collar portion having a radially extending back wall surface, said back wall surface longitudinally disposed from said one coupling end when said coupling ends are engaged, said back wall surface including a first step area, said finger portion engageable with said first step area to hold said coupling ends in engagement; said collar portion further including a first slot, said first slot accepting said leaf spring leg member wherein when said coupling ends are engaged whereby relative rotational movement of said coupling ends is prevented, said first slot bounded radially inward by a first tapered portion adjacent said first step area, the height of said tapered portion increasing with proximity to the adjacent step area.

2. The coupling according to claim 1 wherein said coupling comprises generally diametrically opposed first and second leaf spring leg members fixably attached to said one end of said coupling, and wherein said collar portion comprises first and second step areas on said back wall surface, and wherein said collar portion includes first and second slots accepting said first and second leg members respectively when said coupling ends are engaged, and first and second tapered portions adjacent said first and second step areas and radially inwardly bounding said first and second step areas and radially inwardly bounding said first and second slots respectfully.

3. The coupling according to claim 2 wherein said female coupling end includes said circumferentially extending collar portion.

4. The coupling according to claim 2 wherein said collar portion of said female end is bounded by a radially extending front wall surface, said front wall surface adjacent said male end when said coupling ends are engaged, and wherein said male end includes a radially extending flange portion extending outward from said extending portion, said flange portion of said male end adjacent said front wall of said female end when said coupling ends are engaged.

5. The coupling according to claim 4 wherein said extending portion of said male end includes a first circumferentially extending recess therein and said seal means includes a first o-ring seal positioned in said first circumferential recess.

6. The coupling according to claim 5 wherein said extending portion of said male end includes a second circumferentially extending recess disposed from said first circumferentially recess, and wherein said seal means further comprises a second o-ring seal positioned in said second circumferentially extending recess.

7. The coupling according to claim 2 wherein said first and second in-turned finger portions of said first and second leaf spring leg members respectively comprise in-turned u-shaped ends, said u-shaped ends of said first and second leaf spring leg members terminating in first and second end surfaces respectively, said first and second end surfaces extending substantially parallel to said back wall surface.

8. The coupling according to claim 2 wherein said first and second leaf spring leg members comprise portions of a unitary spring body.

9. The coupling according to claim 8 wherein said spring body is generally u-shaped in cross section, and wherein said flange portion of said male end has a back side disposed from said female end when said coupling ends are engaged, said spring body supported by the back side of said flange portion.

10. A coupling for releasably connecting fluid conduits in fluid tight relation for enabling the flow of fluid material therethrough, comprising:
a male end and a female end;
said female end including an aperture therein;
said male end including an extending portion, said extending portion having a first fluid passage therethrough, said extending portion accepted in said aperture in fluid tight relation when said coupling ends are engaged;
at least one first leaf spring leg member extending between and engaging said male and female ends when said coupling ends are engaged, a first member end of said first leaf spring leg member fixably attached to one of said coupling ends and engageable with a step area on said other coupling end, whereby said leg member is operative to hold said ends in engagement;
said coupling further including longitudinally extending first slot means on said other coupling end, said slot means bounded by surfaces extending radially outward beyond said first member end for accepting said first leaf spring leg member when said ends are in engagement and for preventing relative rotational movement of said engaged coupling ends.

11. A coupling for connecting fluid conduits in fluid tight relation for enabling the flow of fluid material therethrough, comprising:
a male end and a female end;
said female end including an aperture therein, and said male end including a first fluid passage therethrough, said aperture and first fluid passage in fluid tight relation when said coupling ends are engaged; and
at least one longitudinally extending spring means adapted for engagement with said male and female ends when said coupling ends are engaged wherein said spring means is operative to hold said ends in engagement,
and wherein said spring means is fixably attached at a first spring end to one of said coupling ends and wherein said other of said coupling ends includes longitudinally extending slot means, said slot means bounded by surfaces extending traverse of said longitudinal direction and radially outward beyond said first spring end for accepting said spring means therein when said coupling ends are in engagement, whereby relative rotational movement of said engaged coupling ends is prevented.

12. The coupling according to claim 11 wherein said spring means comprises a leaf spring, and wherein said leaf spring includes engaging means for engaging the other of said coupling ends.

13. The coupling according to claim 12 wherein said spring means comprises a pair of diametrically opposed leaf springs, and wherein said engaging means comprises a radially inward extending finger portion on each leaf spring.

14. The coupling according to claim 13 wherein said finger portions each engage a step area to hold said coupling ends in engagement, and wherein each said step area has a tapered portion adjacent thereto, the height of each said tapered portion increasing with proximity to said adjacent step area.

15. A male coupling end for releasably engaging with a female coupling end in fluid tight relation for enabling the flow of fluid material through said coupling ends, said female coupling end including an aperture therein, a pair of generally opposed step areas and a pair of tapered portions, each tapered portion adjacent one of said step areas, the height of each said tapered portion increasing with proximity to said adjacent step area, said female coupling and including at least one longitudinally extending slot, said slot bounded by surfaces extending radially outward, said male coupling end including an extending portion accepted in said aperture when said coupling ends are engaged, a first fluid passage through said extending portion whereby fluid is enabled to flow between said male coupling end and said female coupling end, and a pair of generally opposed leaf spring leg members each having a first end attached to said male coupling end and a second end having an inwardly extending finger portion, wherein said finger portions engage said step areas when said coupling ends are engaged to hold said coupling ends in engagement, and wherein at least one of said leg members is accepted in said slot and said radially outward extending surfaces extend beyond the first end of said one leg member, whereby relative rotational movement of said coupling ends is prevented.

16. A coupling releasably connecting fluid conduits in fluid tight relation and enabling the flow of fluid material therethrough, comprising:
a first coupling end and a second coupling end, each coupling end having a fluid passage therethrough, said fluid passages connected in fluid tight relation when said coupling ends are engaged;
a pair of leaf spring leg members, each said leaf spring leg member mounted at a first member end to said first coupling end, said leaf spring leg members extending generally longitudinally and diametrically opposed, each leg member having a radially extending finger portion at a second member end disposed from said first member end;
a collar portion extending circumferentially on a said second coupling end, said collar portion including a radially extending back wall surface, said back wall surface longitudinally disposed from said first coupling end when said coupling ends are engaged, said back wall surface including a pair of step areas thereon, each step area engaging a finger portion of a leg member when said coupling ends are engaged, said collar portion including a pair of longitudinally extending slots in said collar portion, wherein a leg member is accepted in each said slot when said coupling ends are engaged.

* * * * *